United States Patent
Dong et al.

(10) Patent No.: US 10,687,266 B2
(45) Date of Patent: Jun. 16, 2020

(54) METHOD AND APPARATUS FOR SUPPORTING BROADCAST DATA IN WIRELESS COMMUNICATION SYSTEM

(71) Applicant: Samsung Electronics Co., Ltd., Gyeonggi-do (KR)

(72) Inventors: Jeongsik Dong, Gyeonggi-do (KR);
Daejoong Kim, Gyeonggi-do (KR);
Junhyuk Song, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/519,729

(22) PCT Filed: Oct. 15, 2015

(86) PCT No.: PCT/KR2015/010887
§ 371 (c)(1),
(2) Date: Apr. 17, 2017

(87) PCT Pub. No.: WO2016/060491
PCT Pub. Date: Apr. 21, 2016

(65) Prior Publication Data
US 2017/0257811 A1    Sep. 7, 2017

(30) Foreign Application Priority Data
Oct. 15, 2014    (KR) ........................ 10-2014-0139223

(51) Int. Cl.
*H04W 36/30* (2009.01)
*H04W 36/04* (2009.01)
(Continued)

(52) U.S. Cl.
CPC .............. *H04W 36/30* (2013.01); *H04B 1/44* (2013.01); *H04W 36/00* (2013.01);
(Continued)

(58) Field of Classification Search
CPC ..... H04W 36/06; H04W 36/08; H04W 36/10; H04W 36/12; H04W 36/14;
(Continued)

(56) References Cited

U.S. PATENT DOCUMENTS 7,437,178 B2 * 10/2008 Jeong ................ H04W 36/0055
455/525
7,948,940 B2 * 5/2011 Jeong .................... H04H 20/57
370/329
(Continued)

FOREIGN PATENT DOCUMENTS

CN        102685830        9/2012
EP        1 874 075        1/2008
(Continued)

OTHER PUBLICATIONS

PCT/ISA/210 Search Report issued on PCT/KR2015/010887 (pp. 4).
(Continued)

*Primary Examiner* — Magdi Elhag
(74) *Attorney, Agent, or Firm* — The Farrell Law Firm, P.C.

(57) ABSTRACT

The present invention relates to a method and an apparatus for supporting broadcast data in a wireless communication system, the method for a base station for transmitting data in a wireless communication system according to the present invention comprising the steps of: generating a system information block comprising a first item of hysteresis information for a first type terminal and a second item of hysteresis information for a second type terminal; and broadcasting the generated system information block.

14 Claims, 10 Drawing Sheets

(51) Int. Cl.
*H04W 48/10* (2009.01)
*H04W 36/00* (2009.01)
*H04W 76/40* (2018.01)
*H04B 1/44* (2006.01)
*H04W 4/06* (2009.01)
*H04W 72/00* (2009.01)
*H04L 12/18* (2006.01)
*H04W 88/02* (2009.01)

(52) U.S. Cl.
CPC ....... *H04W 36/0083* (2013.01); *H04W 36/04* (2013.01); *H04W 48/10* (2013.01); *H04W 76/40* (2018.02); *H04L 12/18* (2013.01); *H04W 4/06* (2013.01); *H04W 72/005* (2013.01); *H04W 88/02* (2013.01)

(58) Field of Classification Search
CPC ... H04W 36/165; H04W 36/18; H04W 36/22; H04W 36/24; H04W 36/26; H04W 36/30; H04W 36/32; H04W 36/38; H04W 36/04; H04B 1/44
See application file for complete search history.

(56) References Cited

U.S. PATENT DOCUMENTS

| | | | |
|---|---|---|---|
| 8,712,414 B2* | 4/2014 | Somasundaram | H04W 36/0055 455/436 |
| 9,161,276 B2* | 10/2015 | Wang | H04W 36/0055 |
| 9,185,623 B2* | 11/2015 | Uemura | H04W 36/30 |
| 9,686,770 B2* | 6/2017 | Hsu | H04W 72/005 |
| 10,194,362 B2* | 1/2019 | Hoehne | H04W 36/04 |
| 2005/0041608 A1 | 2/2005 | Jeong et al. | |
| 2006/0039309 A1* | 2/2006 | Lee | H04W 36/0007 370/312 |
| 2008/0227453 A1* | 9/2008 | Somasundaram | H04W 48/20 455/436 |
| 2008/0268878 A1* | 10/2008 | Wang | H04W 68/00 455/458 |
| 2008/0287129 A1* | 11/2008 | Somasundaram | H04W 36/0055 455/436 |
| 2010/0130202 A1* | 5/2010 | Yu | H04W 48/16 455/434 |
| 2010/0216454 A1 | 8/2010 | Ishida et al. | |
| 2011/0053566 A1 | 3/2011 | Nader | |
| 2013/0077553 A1 | 3/2013 | Nielsen et al. | |
| 2013/0322320 A1 | 12/2013 | Lee et al. | |
| 2013/0336173 A1 | 12/2013 | Mandil et al. | |
| 2014/0247717 A1* | 9/2014 | Jamadagni | H04W 4/06 370/230 |
| 2015/0282034 A1* | 10/2015 | Martin | H04W 36/08 370/332 |

FOREIGN PATENT DOCUMENTS

| | | |
|---|---|---|
| EP | 2262311 A2 * | 12/2010 |
| JP | 2009-182944 | 8/2009 |
| JP | 2009182944 * | 8/2009 |
| WO | WO 2005/101886 | 10/2005 |
| WO | WO 2013/055087 | 4/2013 |

OTHER PUBLICATIONS

PCT/ISA/237 Written Opinion issued on PCT/KR2015/010887 (pp. 5).
3GPP; TSG RAN; Evolved Universal Terrestrial Radio Access (E-UTRA); User Equipment (UE) procedures in idle mode (Release 12), 3GPP TS 36.304 V12.2.0, Sep. 23, 2014.
Alcatel-Lucent Shanghai Bell et al., "Enhancement of Cell Reselection for MBMS Service Continuity", R2-112230, 3GPP TSG-RAN WG2 Meeting #73bis, Apr. 11-15, 2011, 4 pages.
NEC, "RRC Signalling Load on MCCH", R2-040809, 3GPP TSG-RAN2#41bis, Apr. 20-22, 2004, 6 pages.
European Search Report dated Jul. 20, 2017 issued in counterpart application No. 15850469.6-1854, 11 pages.
User Equipment (UE) procedures in idle mode (Release 9), 3GPP TS 36.304 V9.11.0, Jun. 2012, 3 pages.
Japanese Office Action dated Jun. 24, 2019 issued in counterpart application No. 2017-520435, 7 pages.
Anonymous, "Network Selection and Ping Pong Effect", R2-060586, 3GPP TSG-RAN WG2 Meeting #52, Feb. 13-17, 2006, 5 pages.
Chinese Office Action dated Feb. 3, 2020 issued in counterpart application No. 201580066539.X, 18 pages.

* cited by examiner

METHOD AND APPARATUS FOR SUPPORTING BROADCAST DATA IN WIRELESS COMMUNICATION SYSTEM

PRIORITY

This application is a National Phase Entry of PCT International Application No. PCT/KR2015/010887 which was filed on Oct. 15, 2015, and claims priority to Korean Patent Application No. 10-2014-0139223, which was filed on Oct. 15, 2014, the contents of each of which are incorporated herein by reference.

TECHNICAL FIELD

The present invention relates to wireless communication systems, and more particularly, to a method and apparatus for providing Multimedia Broadcast Multicast Service (MBMS) data in a Long Term Evolution (LTE) system.

BACKGROUND ART

In general, mobile communication systems were developed to provide voice call services, supporting users' mobility. Mobile communication systems have increased the service field to data services as well as voice call services, and have recently been developed so that they can provide high speed data services. As mobile communication systems evolve to provide a wider range of services, they face lack of resources and users' demands for high speed data services. Therefore, the development of mobile communication systems is required.

In order to comply with users' demands, Long term Evolution (LTE) that has been developed as a next generation communication system is standardized in the 3$^{rd}$ Generation Partnership Project (3GPP). LTE is a technology to implement high speed packet-based communication supporting a maximum transmission rate of up to 100 Mbps. To this end, various proposals have been discussed. As an example, a scheme has been proposed to reduce the number of nodes on communication paths by simplifying network architecture. Another scheme has been proposed to apply radio protocols to wireless channels as close as possible.

Meanwhile, unlike a voice service, a data service determines its resources, etc., which can be allocated according to the amount of data to be transmitted and the channel quality. Therefore, in a wireless communication system such as a mobile communication system, a scheduler performs the management, such as, the allocation of transmission resources, etc., considering an amount of resources for the transmission, the channel quality, an amount of data, etc. This is also performed the same by an LTE as one of the next generation mobile communication systems, in such a way that a scheduler located in an eNB performs the management and allocation of wireless transmission resources.

In recent LTE communication systems, discussion have been made about LTE-Advanced (LTE-A) that is combined with various types of new technologies to enhance the transfer rate. LTE-A systems also include the improvement of Multimedia Broadcast Multicast Service (MBMS). MBMS is referred to as a broadcast service provided via an LTE system.

Service providers must optimize a service area for MBMS services as well as that for unicast communication. In particular, if UE moves between cells, a scheme is required to provide the UE with continuous MBMS services.

DISCLOSURE OF INVENTION

Technical Problem

The present invention has been made according to the demands described above, and provides to a method and apparatus for continuously providing Multimedia Broadcast Multicast Service (MBMS) data in a Long Term Evolution (LTE) system.

The present invention further provides a method and apparatus that prevents the cell reselection from frequently occurring when UE receiving MBMS data moves between cells.

Solution to Problem

In order to resolve the problems described above, in accordance with an aspect of the present invention, an information transmission method of an eNB in a wireless communication system is provided. The method includes: generating a system information block including first hysteresis information regarding a first type of UE and second hysteresis information regarding a second type of UE; and broadcasting the generated system information block.

In accordance with another aspect of the present invention, a method for user equipment (UE) to perform the cell reselection in a wireless communication system is provided. The method includes: receiving a system information block from an eNB; determining whether Multimedia Broadcast Multicast Service (MBMS) data is being received; and performing the cell reselection, based on the determination and the system information block.

In accordance with another aspect of the present invention, an eNB for transmitting information in a wireless communication system is provided. The eNB includes: a transceiver for performing the transmission/reception of signals; and a controller for: generating a system information block including first hysteresis information regarding a first type of UE and second hysteresis information regarding a second type of UE; and broadcasting the generated system information block.

In accordance with another aspect of the present invention, user equipment (UE) for performing the cell reselection in a wireless communication system is provided. The UE includes: a transceiver for transmitting/receiving signals to/from an eNB; and a controller for: receiving a system information block from the eNB; determining whether Multimedia Broadcast Multicast Service (MBMS) data is being received; and performing the cell reselection, based on the determination and the system information block.

Advantageous Effects of Invention

The present invention is capable of preventing the cell reselection from frequently occurring when UE receiving MBMS data moves between cells, so that the UE can continuously receive MBMS data without interruption.

MODE FOR THE INVENTION

Figure 1:
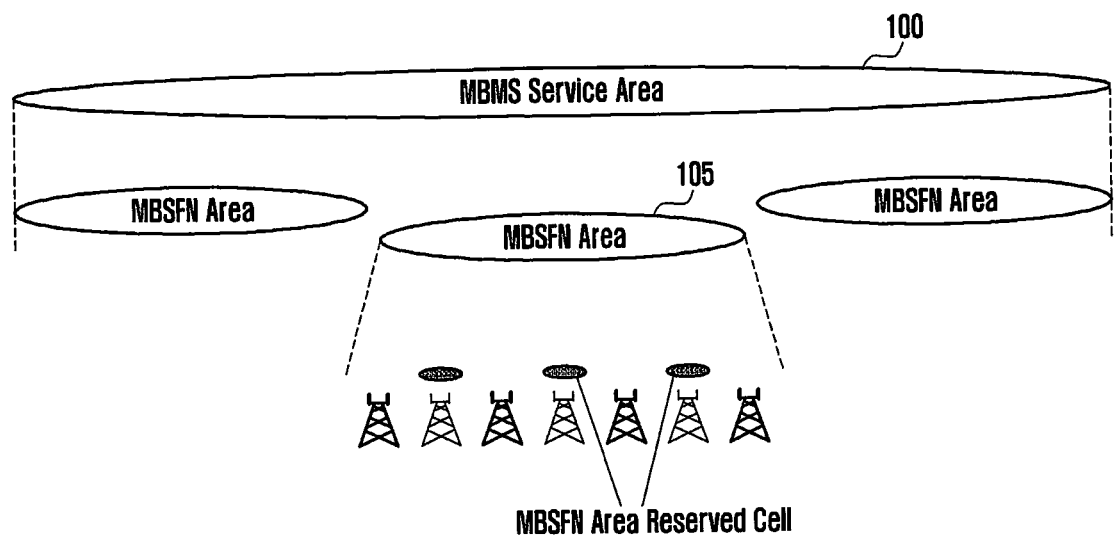
FIG. 1 is a conceptual diagram of MBMS.

Embodiments of the present invention are described in detail referring to the accompanying drawings. It should be understood that the same reference numbers are used throughout the drawings to refer to the same parts. Detailed descriptions of well-known functions and structures incorporated herein may be omitted to avoid obscuring the subject matter of the invention.

In the embodiments, detailed descriptions of the technical content which is well-known and is not directly related to the embodiments of the present disclosure is omitted to avoid obscuring the subject matter of the invention.

The drawings are not necessarily to scale and certain features may be exaggerated, omitted, or simplified in order to better illustrate and explain the invention. The same reference numbers are used throughout the drawings to refer to the same or similar parts.

The features and advantages of the invention and the method to achieve them will become more apparent from the following detailed description in conjunction with the accompanying drawings. It will be easily appreciated to those skilled in the art that various modifications, additions and substitutions are possible from the embodiments of the invention that are illustrated and described in detail in the following description, and the scope of the invention should not be limited to the following embodiments. The embodiments of the present invention are provided such that those skilled in the art will completely understand the invention. It should be understood that the invention may include all modifications and/or equivalents and/or substitutions included in the idea and technical scope of the present disclosure. In the drawings and description, the same or similar elements are denoted by the same reference numerals even though they are depicted in different drawings.

It should be understood that the processes, operations, and a combination thereof in the flowcharts can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flowchart. In order to implement functions in a particular mode, the computer programming instructions can also be stored in a computer available memory or a computer readable recording memory that can support computers or data processing equipment that can be programmed. Therefore, the instructions, stored in the computer available memory or computer readable memory, can be installed to the products, and perform the functions therein, described in the block (blocks) of the flowchart therein. In addition, since the computer programming instructions can also be installed to computers or data processing equipment that can be programmed, they can generate processes that perform a series of operations therein, described in the blocks of the flowchart therein.

The blocks of the flowchart refer to part of codes, segments or modules that include one or more executable instructions to perform one or more logic functions. It should be noted that the functions described in the blocks of the flowchart may be performed in a different order from the embodiments described above. For example, the functions described in two adjacent blocks may be performed at the same time or in reverse order.

In the embodiments, the terminology, component '~ unit,' refers to a software element or a hardware element such as a PGGA, an ASIC, etc., and performs a corresponding function. It should be, however, understood that the component 'unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

FIG. 1 is a conceptual diagram of MBMS.

An MBMS service area 100 is referred to as a network area including a number of eNBs capable of performing the Multimedia Broadcast multicast service Single Frequency Network (MBSFN) transmission.

An MBSFN Area 105 (which may also be called broadcast area information) is referred to as a network area including a number of cells which are integrated with each other to perform the MBSFN transmission. All the cells in the MBSFN area are synchronized for the MBSFN transmission.

All the cells except for MBSFN Area Reserved Cells 110 are used for the MBSFN transmission. MBSFN Area Reserved Cells 110 are referred to as cells that are not used for the MBSFN transmission. MBSFN Area Reserved Cells 110 may be used for the transmission for other objectives; however, they may be allowed for limited transmission power for radio resources assigned to the MBSFN transmission.

Figure 2:
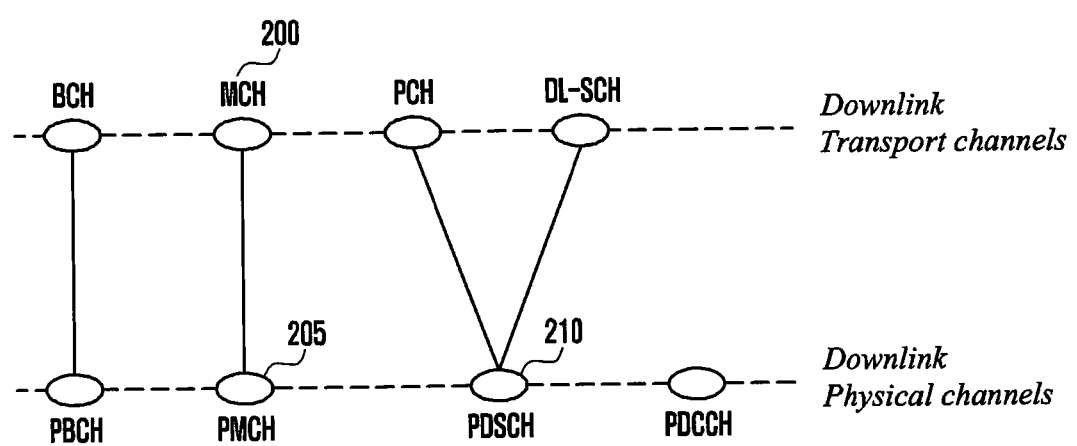
FIG. 2 is a diagram showing the downlink channel mapping relationship used for the MBSFN transmission.

FIG. 2 is a diagram showing the downlink channel mapping relationship used for the MBSFN transmission.

As shown in FIG. 2, MCH 200 is used between an MAC layer and a physical layer. MCH is mapped to PMCH 205 of a physical layer.

A unicast scheme transmitting data to only a specific UE generally uses Physical Downlink Shared Channel (PDSCH) 210.

Figure 3:
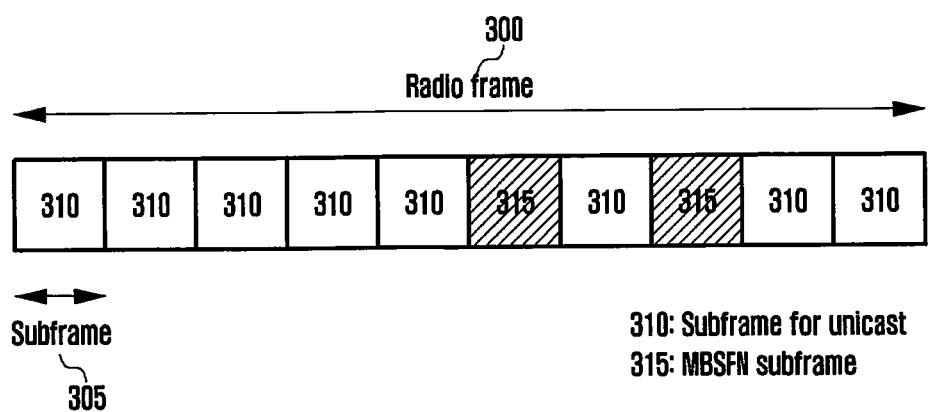
FIG. 3 is a structure of a downlink frame used in LTE systems.

FIG. 3 is a structure of a downlink frame used in LTE systems.

As shown in FIG. 3, a radio frame 300 includes 10 subframes 305. Each subframe may be a 'normal subframe 310' used for the transmission/reception of general data or 'Multimedia Broadcast multicast service Single Frequency Network (MBSFN) subframe 315' used for the transmission/reception of broadcasts.

Normal subframe and MBSFN subframe differ from each other, in terms of number and structure, with respect to Orthogonal Frequency Division Multiplexing (OFDM) symbols, Cyclic Prefix (CP) length, cell-specific reference signals (CRS), etc.

Meanwhile, in Rel-8 and Rel-9 systems, MBSFN subframes were only used to perform the transmission of broadcast or multicast data, etc. With the development of systems, MBSFN subframes are used for the transmission of unicast data since LTE Rel-10, as well as that for broadcast or multicast data.

In order to efficiently use Physical Downlink Shared Channel (PDSCH) in LTE, UEs are set respectively according to Transmission Mode (TM) related to Reference Signal (RS) and Multi-antenna technology.

In current LTE Rel-10, there are TM1~TM9. Each UE has one TM for the PDSCH transmission. TM 8 is newly defined in Rel-9, and TM 9 is newly defined in Rel-10.

In particular, TM 9 supports single user-multi-input multi-output (SU-MIMO) of a maximum rank of 8. TM 9 supports multi-layer transmission. In the de-modulation, TM 9 makes it possible to transmit a maximum of eight layers, using Rel-10 Demodulation Reference Signal (DMRS). In addition, the Rel-10 DMRS performs the transmission of pre-coded DMRS, but does not need to inform a receiver of a corresponding precoder index.

In order to support TM 9, Rel-10 defines Downlink Control Information (DCI) format 2C. In particular, UEs before Rel-10 do not attempt to perform a decoding operation in MBSFN subframes. Therefore, requiring all UEs to attempt to perform a decoding operation in MBSFN subframes leads UEs of the previous release to upgrade their versions.

TM 9 of the TMs described above is referred to as a transmission mode maximizing the transmission efficiency using a multi-antenna. The eNB according to the present invention receives unicast data via MBSFN subframes, thereby setting UE which needs to increase data throughput to TM 9 and enabling only UE, which has been set in TM 9, to receive unicast data via MBSFN subframes.

In order to perform the transmission/reception of unicast data, an LTE system informs a PDCCH of a location where data is actually transmitted/received. Real data is transmitted via PDSCH. Before receiving real data, UE needs to determine whether the PDCCH has information regarding a resource assigned to the UE.

On the other hand, MBSFN obtains resource assignment information via a relatively more complicated process.

An eNB informs UE of transmission locations of Multi-cast Control Channels (MCCHs) by MBSFN Areas provided by a cell, via System Information Block 13 (SIB13) as broadcast information. MCCH contains resource assignment information for MBSFN. UE decodes MCCH, and thus detects a transmission location of MBSFN subframes.

As described above, MBMS provides resource assignment information via a mode that differs from a conventional unicast, and this is because MBMS must provide the information to UE in idle mode. Therefore, the transmission location of MCCH as a control channel is provided via SIB13 as broadcast information. The reception of MBMS service is explained, below, with reference to FIG. 4.

Figure 4:
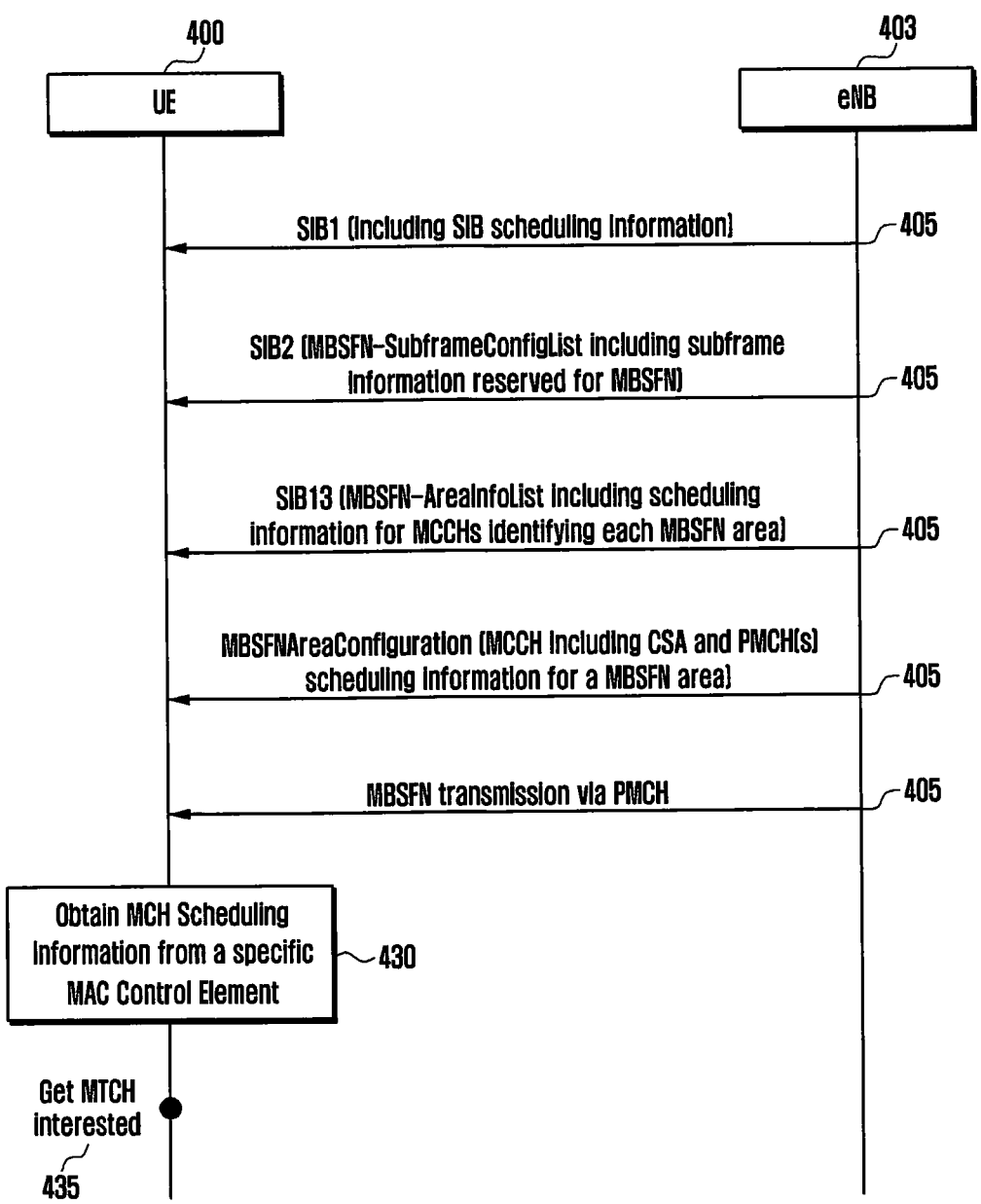
FIG. 4 is a flow diagram that describes a method for UE to receive MBSFN.

FIG. 4 is a flow diagram that describes a method for UE to receive MBSFN.

UE 400 receives SIB1 from eNB 403 in operation 405. The SIB1 includes scheduling information regarding other SIBs. Therefore, in order to receive other SIBs, UE 400 needs to have previously received SIB1.

UE 400 receives SIB2 from eNB 403 in operation 410. An MBSFN subframe configuration list of SIB2 (MBSFN-SubframeConfigList IE) indicates subframes which can be used for MBSFN transmission.

The MBSFN-SubframeConfigList IE includes MBSFN-SubframeConfig IE and indicates a subframe of a radio frame which can be an MBSFN subframe. The following table 1 is a configuration table of MBSFN-SubframeConfig IE.

TABLE 1

MBSFN-SubframeConfig Information element
-- ASN1START
MBSFN-SubframeConfig ::=        SEQUENCE {
    radioframeAllocationPeriod        ENUMERATED
{n1, n2, n4, n8, n16, n32},
    radioframeAllocationOffset        INTEGER [0..7],
    subframeAllocation               CHOICE {
        oneFrame                      BIT
STRING [SIZE[6]]
        fourFrames                    BIT
STRING [SIZE[24]]
    }
}
-- ASN1STOP In the table, the radio frame allocation period (radioFrameAllocationPeriod) and the radio frame allocation offset (radioFrameAllocationOffset) are used to indicate radio frames with MBSFN subframes. Radio frames, satisfying equation, SFN mod radioFrameAllocationPeriod=radioFrameAllocationOffset, have MBSFN subframes.

System Frame Number (SFN) indicates a radio frame number. SFN ranges from 0 to 1023, and repeats the numbers cyclically.

The subframe allocation (subframeAllocation) indicates a subframe which corresponds to an MBSFN subframe in a radio frame indicated by the equation described above.

The subframe allocation (subframeAllocation) may indicate a subframe in a unit of one radio frame or a unit of four radio frames. If a unit of one radio frame is used for the indication, a subframe is indicated by oneFrame IE. An MBSFN subframe may be one of the $1^{st}$, $2^{nd}$, $3^{rd}$, $6^{th}$, $7^{th}$, and $8^{th}$ subframes among a total of 10 subframes in one radio frame. Therefore, oneFrame IE indicates an MBSFN subframe among the subframes listed above, using 6 bits.

If a unit of four radio frames is used for the indication, a subframe is indicated by fourFrames IE. In order to support four radio frames, an MBSFN subframe among the subframe as listed above is indicated by a total of 24 bits, every radio frame. Therefore, UE is capable of detecting correctly a subframe which can be an MBSFN subframe, using MBSFN-SubframeConfigList IE.

If UE 400 needs to receive MBSFN, it receives SIB13 from the eNB 405 in operation 415. MBSFN area information list of SIB13 (MBSFN-AreaInfoList IE) includes location information regarding the transmission of MCCHs by MBSFN areas, provided by a cell. UE receives MCCH using the information in operation 420.

The following table 2 describes MBSFN-AreaInfoList IE.

Every MBSFN area has corresponding MCCH. The MBSFN-AreaInfoList IE includes MCCH scheduling information regarding all MBSFN areas. MBSFN-AreaInfo IE includes MCCH scheduling information and the other information. Mbsfn-AreaId is referred to as an MBSFN area ID. Non-MBSFNregionLength is referred to as the number of symbols corresponding to a non-MBSFN area, among the symbols in the MBFSN subframe. The symbol is located in the front part of the subframe. The notificationIndicator is used to indicate a PDCCH bit informing UE of the alteration of MCCH information. The Mcch-Config IE contains MCCH scheduling information. The Mcch-RepetitionPeriod and the mcch-Offset are used to indicate a location of a frame including MCCH. The Mcch-ModificationPeriod is a transmission period of MCCH. The sf-AllocInfo is a location of a subframe including MCCH in a frame containing the MCCH. The signallingMCS is referred to as a Modulation and Coding Scheme (MCS) applied to (P)MCH and a subframe indicated by sf-AllocInfo.

TABLE 2

| MBSFN-AreaInfoList information element |  |
|---|---|
| -- ASN1START |  |
| MBSFN-AreaInfoList-r9 ::= | SEQUENCE |
| [SIZE[1..maxMBSFN-Area]] OF MBSFN-AreaInfo-r9 | |
| MBSFN-AreaInfo-r9 ::= | SEQUENCE { |
| mbsfn-AreaId-r9 | INTEGER |
| [0..255], | |
| non-MBSFNregionLength | ENUMERATED {s1, s2}, |
| notificationIndicator-r9 | INTEGER [0..7], |
| mcch-Config-r9 | SEQUENCE |
| { | |
| mcch-RepetitionPeriod-r9 | ENUMERATED |
| {rf32, rf64, rf128, rf256}, | |
| mcch-Offset-r9 | |
| INTEGER [0..10], | |
| mcch-ModificationPeriod-r9 | |
| ENUMERATED {rf512, rf1024}, | |
| sf-AllocInfo-r9 | BIT |
| STRING [SIZE[6]], | |
| signallingMCS-r9 | |
| ENUMERATED {n2, n7, n13, n19} | |
| }, | |
| ... | |
| } | |

MBSFN area configuration of MCCH (MBSFNAreaConfiguration IE) indicates a location of a resource used for MBSFN transmission, and UE receives an MBSFN subframe using the information in operation 425. The commonSF-Alloc is referred to as a subframe assigned to an MBSFN area. The commonSF-AllocPeriod is a period by the repetition of subframes indicated by the commonSF-Alloc.

Pmch-InfoList IE includes all PMCH configuration information regarding one MBSFN area.

TABLE 3

| MBSFNAreaConfiguration message |  |
|---|---|
| -- ASN1START |  |
| MBSFNAreaConfiguration-r9 ::= | SEQUENCE { |
| commonSF-Alloc-r9 | |
| CommonSF-AllocPatternList-r9, | |
| commonSF-AllocPeriod-r9 | ENUMERATED { |
| rf4, rf8, rf16, rf32, rf64, rf128, rf256}, | |
| pmch-InfoList-r9 | PMCH-InfoList-r9 |
| nonCriticalExtension | |
| MBSFNAreaConfiguration-v930-IEs | OPTIONAL |
| } | |
| MBSFNAreaConfiguration-v930-IEs ::= SEQUENCE { | |
| lateNonCriticalExtension | OCTET STRING |
|  | OPTIONAL, -- Need OP |
| nonCriticalExtension | SEQUENCE { } |
|  | OPTIONAL, -- Need OP |

TABLE 3-continued

| } | |
|---|---|
| CommonSF-AllocPatternList-r9 ::= | SEQUENCE [SIZE |
| [1..maxMBSFN-Allocations]] OF MBSFN-SubframeConfig | |
| -- ASN1STOP | |

UE obtains a location of MBSFN subframe, transmitting an MTCH of interest, from MCH scheduling information MAC CE, as one of the MAC Control Elements (MAC CEs) of received MAC PDU, in operation 430. UE decodes an MTCH of interest, using MCH scheduling information, in operation 435.

Figure 5:
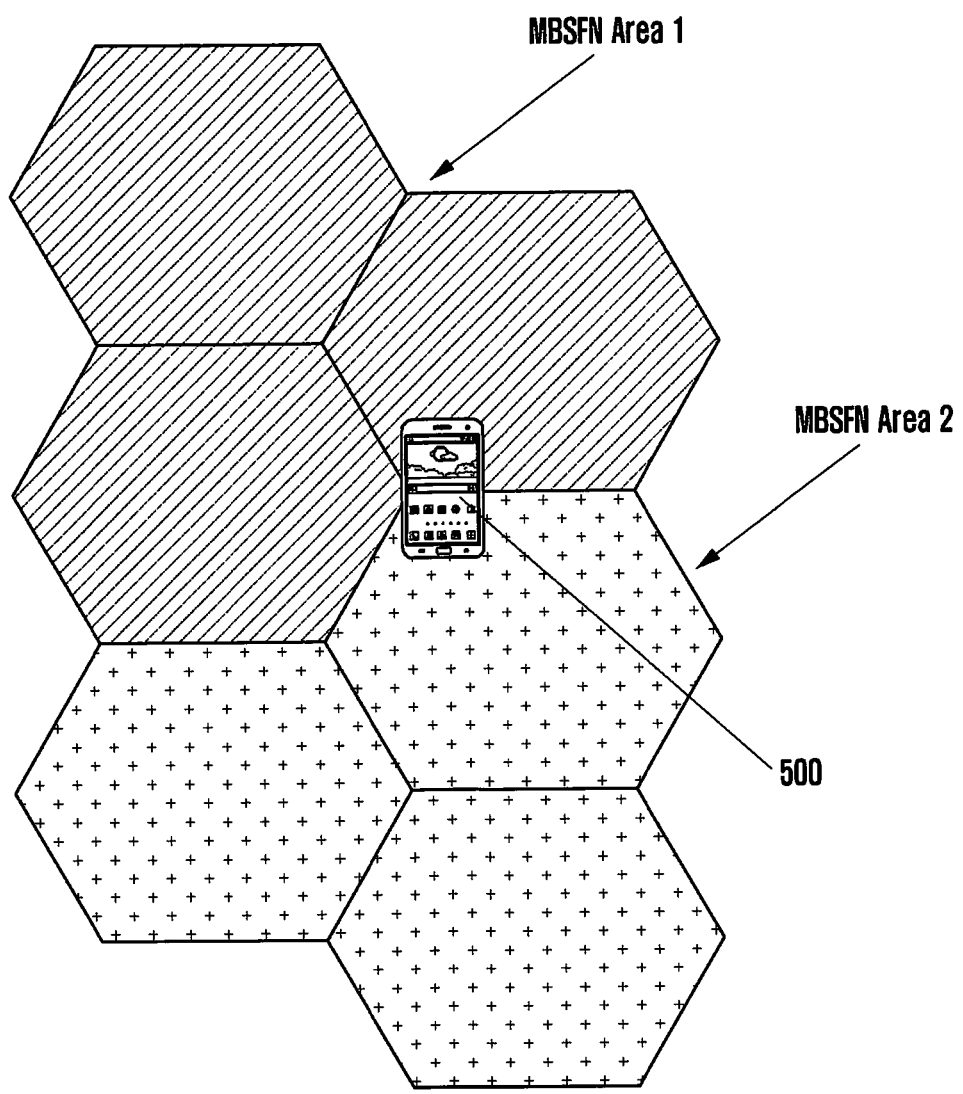
FIG. 5 is a diagram that illustrates a problem which may arise when UE moves between cells.

FIG. 5 is a diagram that illustrates a problem which may arise when UE moves between cells.

When UE 500 receiving (e)MBMS service moves between cells (cell change), it does not decode data received from a PMCH channel until it receives MBSFN area information (or broadcast are information) included in SIB 13 message defined in the standard, and this causes a buffering problem. That is, when UE moves to one cell to another, a video playback delay may occur until the UE has received an SIB 13 message and determined whether the broadcast area information regarding the cell to which UE moved is identical to that regarding the cell where UE had been located.

If UE in idle mode moves to one cell to another, the number of cell reselections increases and this also increases the probability of a buffering phenomenon occurring.

The present invention has been made to resolve the problems described above, and provides a method and apparatus for minimizing a delay in decoding broadcast data in UE moving between cells.

More specifically, the present invention provides a method that applies, to UE which is receiving MBMS data, in idle mode, and moving from one cell to another, a cell reselection setup value which differs from that of UE which is not receiving MBMS data, thereby preventing the cell reselection from frequently occurring in the UE receiving MBMS data.

The present invention further provides a method that enables UE receiving MBMS data to control its cell reselection setup value and thus prevents the cell reselection from frequently occurring when the UE receives moves between cells.

The following description provides a first embodiment of the present invention.

In a first embodiment of the present invention, an eNB is capable of adjusting values of offset information and hysteresis information used to reduce a ping pong phenomenon, among the parameters that the eNB uses when UE performs the cell reselection.

More specifically, the hysteresis information may be Q-Hyst parameter broadcast via System Information Block (SIB) 3. The offset information may be q-OffsetCell parameter broadcast via SIB 4.

In the first embodiment of the present invention, the eNB is capable of controlling the parameter values so that UE can stay in a serving cell as long as possible, thereby reducing the number of cell reselections to be performed by UE.

The first embodiment of the present invention is capable of decreasing the number of cell reselections to be performed by UE, thereby resolving the buffering problem.

The following description provides a second embodiment of the present invention.

In a second embodiment of the present invention, an eNB divides hysteresis information broadcast via SIB 3 into first hysteresis information regarding a first type of UE and second hysteresis information regarding a second type of UE.

In this case, the first type of UE includes UE which is not receiving MBMS data. The first hysteresis information is a parameter that UE, not receiving MBMS data, uses when it performs the cell reselection in idle mode.

The second type of UE includes UE which is receiving MBMS data. The second hysteresis information is a parameter that UE, receiving MBMS data, uses when it performs the cell reselection in idle mode.

UE in idle mode monitors whether there is a neighboring cell whose received signal strength is greater than that of a current serving cell. If there has been a neighboring cell whose received signal strength indicator is greater than that of a current serving cell, the UE reselect the neighboring cell as a serving cell, which is called cell reselection.

UE measures ranking scores regarding a serving cell and at least one neighboring cell, through the following equation.

$$Rs = Qmeas,s + Qhyst$$

$$Rn = Qmeas,n - Qoffset,s,n \quad \text{[equation 1]}$$

In the equation, Rs denotes a ranking score of a serving cell, and Rn denotes a ranking score of one of the neighboring cells. Qmeas,s denotes the reception power of a serving cell signal received by a receiver of UE. Qmeas,n the reception power of a neighboring cell signal received by a receiver of UE.

As described in equation 1, a ranking score for a serving cell is measured considering a hysteresis parameter, and this is to prevent a ping-pong phenomenon, caused owing to the incorrect cell reselection by UE, from being generated. More specifically, UE performs the cell reselection to a neighboring cell only if the UE discovers the neighboring cell whose received signal strength indicator is greater than a sum of a measurement result from a serving cell and a hysteresis parameter value.

Similarly, as described in equation 1, a ranking score for a neighboring cell is measured considering an offset parameter, and this is to prevent a ping-pong phenomenon, caused owing to the incorrect reselection of UE, from being generated.

In the second embodiment of the present invention, the hysteresis information is divided into first hysteresis information for UE receiving MBMS data and second hysteresis information for UE not receiving MBMS data.

Therefore, UE performs cell reselection based on hysteresis information corresponding to a condition as to whether it receives MBMS data. For example, UE receiving MBMS data may perform cell reselection based on second hysteresis information that has a relatively large value, thereby reducing the number of cell reselections.

To this end, content of SIB 3 broadcast by an eNB may be changed as in the following table 4.

TABLE 4

| |
|---|
| SystemInformationBlockType3 ::=  SEQUENCE { |
|    cellReselectionInfoCommon  SEQUENCE { |
|       q-Hyst |
|       ENUMERATED { |
|          dB0, dB1, dB2, dB3, dB4, dB5, dB6, dB8, dB10, |
|          dB12, dB14, dB16, dB18, dB20, dB22, dB24}, |
|       q-Hyst-eMBMS |
|       ENUMERATED { |
|          dB0, dB1, dB2, dB3, dB4, dB5, dB6, dB8, dB10, |

TABLE 4-continued

| |
|---|
|          dB12, dB14, dB16, dB18, dB20, dB22, dB24}, |
|    speedStateReselectionPars  SEQUENCE |
|    { |
|       mobilityStateParameters |
|    MobilityStateParameters, |
|       q-HystSF |
|    SEQUENCE { |
|       sf-Medium |
|    ENUMERATED { |
|       dB-6, dB-4, dB-2, dB0}, |
|       sf-High |
|    ENUMERATED { |
|       dB-6, dB-4, dB-2, dB0} |
|       } |
|    } |
|                                       OPTIONAL    -- |
| Need OP |
|    }, |

Operations of an eNB and UE according to a second embodiment of the present invention are described, below, with reference to FIGS. 6 and 7.

Figure 6:
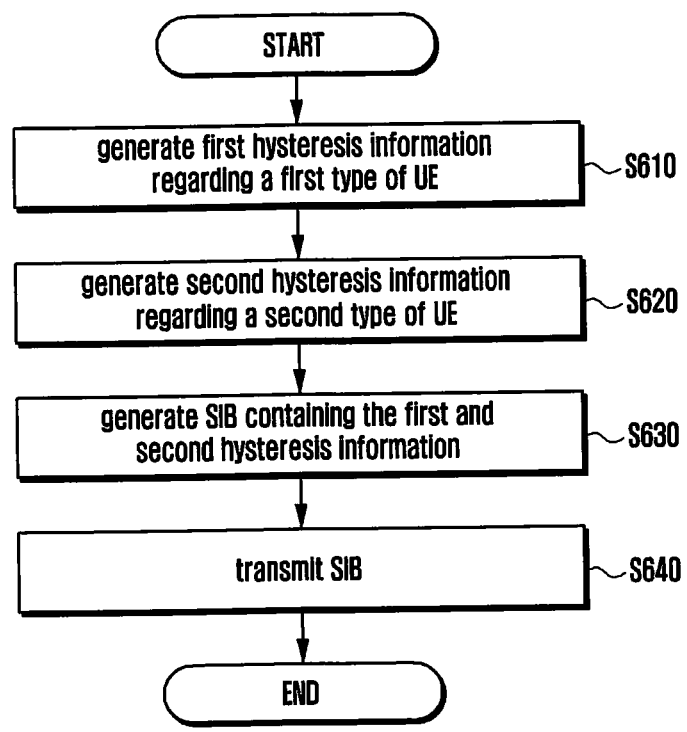
FIG. 6 is a flowchart that describes operations of an eNB according to embodiment 2.

FIG. 6 is a flowchart that describes operations of an eNB according to embodiment 2.

An eNB is capable of generating first hysteresis information regarding a first type of UE in operation S610. In this case, the first type of UE may include UE not receiving MBMS data.

The eNB is capable of generating second hysteresis information regarding a second type of UE in operation S620. In this case, the second type of UE may include UE receiving MBMS data.

In the embodiment, a value according to the second hysteresis information may be greater than that of the first hysteresis information by a preset criterion or more.

The eNB is capable of generating SIB containing the first hysteresis information and the second hysteresis information in operation S630. In the embodiment, the SIB may include SIB 3.

The eNB is capable of broadcasting the generated SIB in operation S640.

Figure 7:
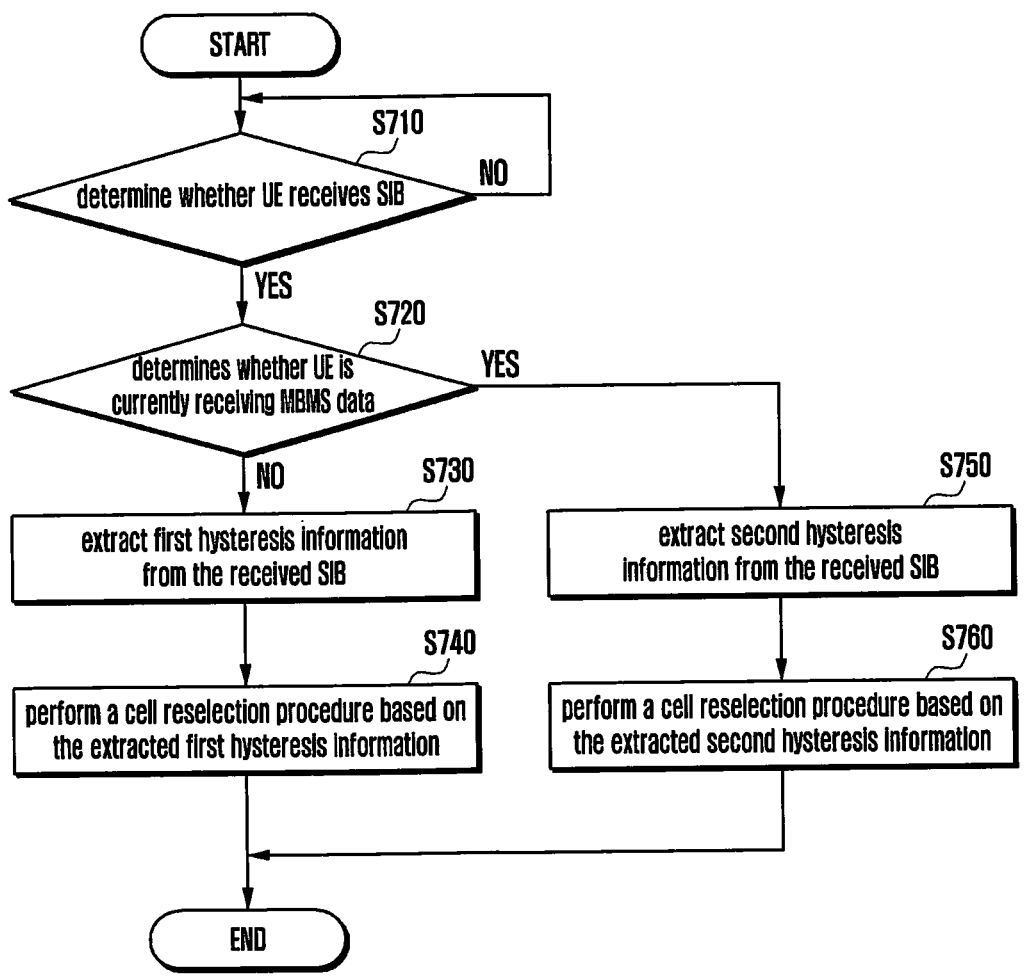
FIG. 7 is a flowchart that describes operations of UE according to embodiment 2.

FIG. 7 is a flowchart that describes operations of UE according to embodiment 2.

UE determines whether it receives SIB from an eNB in operation S710. In this case, the SIB may include SIB 3.

UE determines whether it is currently receiving MBMS data in operation S720.

If UE is not currently receiving MBMS data in operation S720, it extracts first hysteresis information from the received SIB in operation S730. UE performs a cell reselection procedure based on the extracted first hysteresis information in operation S740. UE in idle mode performs the cell reselection procedure.

On the other hand, if UE is receiving MBMS data, it extracts second hysteresis information from the received SIB in operation S750. UE performs a cell reselection procedure based on the extracted second hysteresis information in operation S760.

The embodiment is implemented, assuming that UE may receive MBMS data, in such a way as to perform a cell reselection procedure based on hysteresis information corresponding to a condition as to whether UE is receiving MBMS data at a timing point that the UE receives SIB.

However, it should be understood that the present invention is not limited to the embodiment based on the assumption condition. For example, the embodiment may also be modified in such a way that UE which is not capable of receiving MBMS data performs the same operations as UE which is not receiving MBMS data.

The following description provides a third embodiment of the present invention.

In the third embodiment of the present invention, UE receiving MBMS data performs a cell reselection, using offset information as well as hysteresis information included in SIB 3 broadcast by an eNB.

If UE performs a cell reselection using a sum of a value according to hysteresis information included in SIB 3 and a value according to offset information, a ranking score for a serving cell increases as described in equation 1. In this case, if UE receives MBMS data, it may reduce the number of cell reselections.

The third embodiment of the present invention is described, in detail, below, with reference to FIG. 8.

Figure 8:
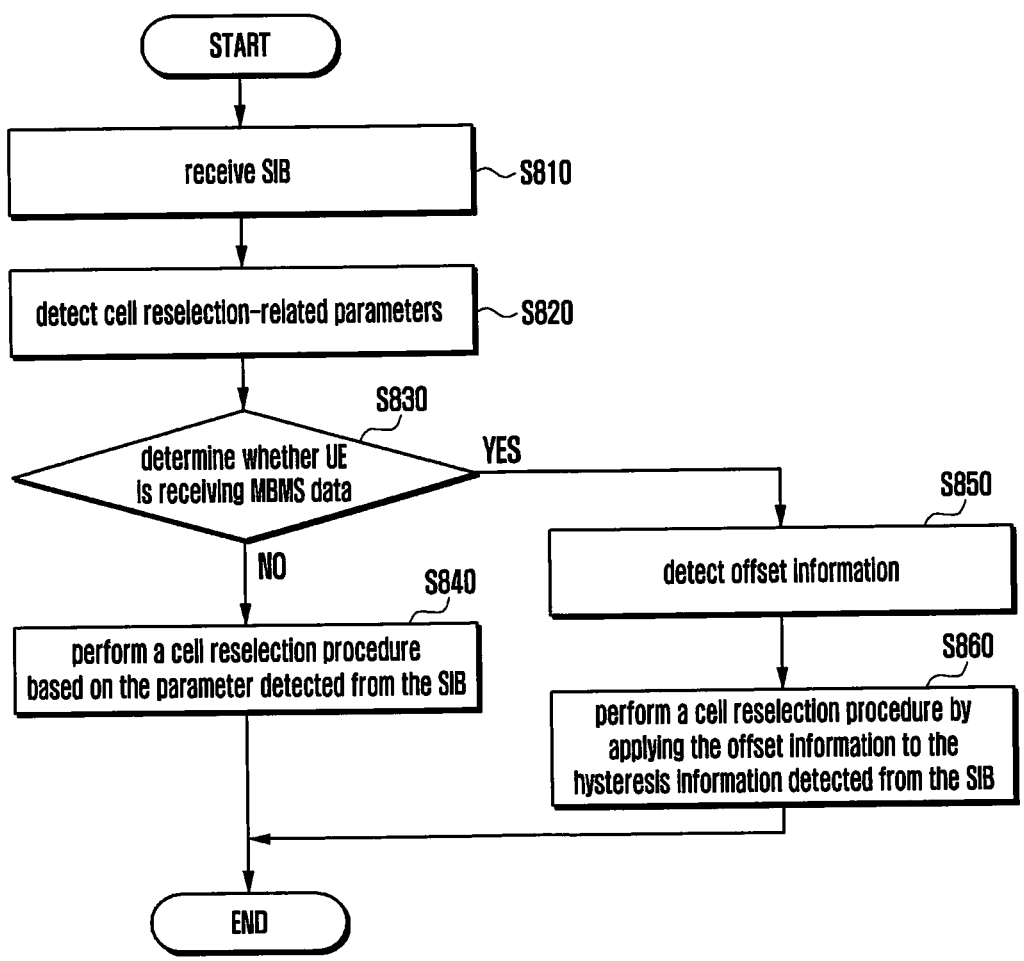
FIG. 8 is a flowchart that describes operations of UE according to embodiment 3.

FIG. 8 is a flowchart that describes operations of UE according to embodiment 3.

UE is capable of receiving SIB from an eNB in operation S810. In the embodiment, the SIB may be SIB 3.

If UE is synchronized with the eNB, it may receive Master Information Block via Physical Broadcast Channel (PBCH) as a broadcast channel, and thus may obtain scheduling information regarding SIB. Therefore, UE receives SIB.

UE is capable of detecting cell reselection-related parameters from the received SIB 3 in operation S820. The cell reselection-related parameters may include hysteresis information (Qhyst).

UE enters idle mode at a specific timing point. If UE needs to perform a cell reselection procedure, it determines whether it is receiving MBMS data in operation S830.

If the UE is not receiving MBMS data in operation S830, it is capable of performing a cell reselection procedure based on the parameter detected from the SIB, e.g., hysteresis information in operation S840.

On the other hand, If the UE is receiving MBMS data in operation S830, it is capable of detecting offset information in operation S850. The offset information may be a specific value preset to UE. In an embodiment, the eNB may transmit the offset information to the UE via a signaling process or a physical channel.

After detecting the offset information, the UE is capable of performing a cell reselection procedure based on the offset information and the hysteresis information detected from the SIB in operation S860.

Figure 9:
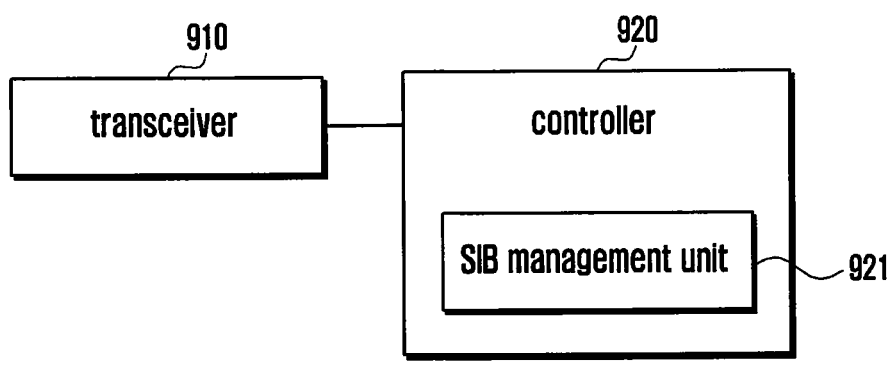
FIG. 9 is a block diagram showing an eNB according to an embodiment of the present invention.

FIG. 9 is a block diagram showing an eNB according to an embodiment of the present invention. As shown in FIG. 9, an eNB of the present invention is capable of including a transceiver 910 and a controller 920.

The transceiver 910 is capable of providing a unit capable of transmitting/receiving signals to/from a core node of a wireless communication system or UE. For example, if an eNB transmits/receives signals to/from UE, the transceiver 910 establishes a wireless channel between the eNB and UE, so that they can perform the transmission/reception of signals via the channel. In contrast, if an eNB transmits/receives signals to/from a core node, the transceiver 910 provides a wired interface, so that they can perform the transmission/reception of signals via the interface.

The controller 920 is capable of controlling signals flowing among blocks, thereby performing operations according to the embodiment of the present invention. In an embodiment, the controller 920 may further include a system information block (SIB) management unit 921.

The SIB management unit 921 is capable of generating SIB containing first hysteresis information regarding a first type of UE and second hysteresis information regarding a second type of UE. The SIB management unit 9210 is capable of controlling the broadcast of the generated SIB.

In this case, the first type of UE may include UE not receiving Multimedia Broadcast Multicast Service (MBMS) data. The second type of UE may include UE receiving MBMS data. The SIB may include SIB 3.

The first hysteresis information and the second hysteresis information may be used when the first type of UE or the second type of UE performs a cell reselection.

Although the embodiment is implemented in such a way that the controller 920 and the SIB management unit 921 are separated from each other and perform functions that differ from each other, respectively, it should be understood that the present invention is not limited thereto. For example, the embodiment may be modified in such a way that the controller 920 may directly perform the functions performed by the SIB management unit 921.

Figure 10:
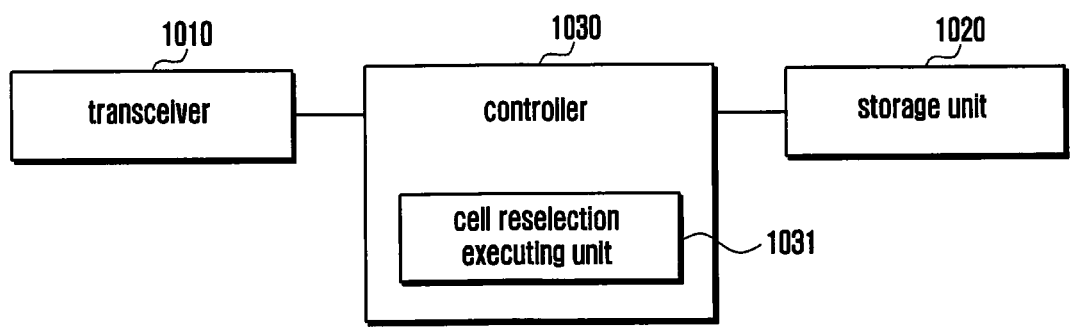
FIG. 10 is a block diagram showing UE according to an embodiment of the present invention.

FIG. 10 is a block diagram showing UE according to an embodiment of the present invention. As shown in FIG. 10, UE of the present invention is capable of including a transceiver 1010, a storage unit 1020, and a controller 1030.

The transceiver 1010 is capable of establishing a wireless channel with an eNB and transmitting/receiving signals via the channel. In the embodiment, the transceiver 1010 is capable of receiving system information block (SIB) from the eNB and transferring the SIB to the controller 1030.

The storage unit 1020 is capable of storing software, programs, etc. required for UE to run. In the embodiment, the storage unit 1020 is capable of storing offset information required for UE to perform a cell reselection.

The controller 1030 is capable of controlling signals flowing among blocks so that UE can perform operations according to the embodiment of the present invention. In an embodiment, the controller 1030 may further include a cell reselection executing unit 1031.

The cell reselection executing unit 1031 is capable of receiving SIB from the eNB, and determining whether UE is receiving Multimedia Broadcast Multicast Service (MBMS) data. The cell reselection executing unit 1031 is capable of controlling UE to perform a cell reselection based on the determination result and the SIB.

More specifically, if the UE is not receiving MBMS data, the cell reselection executing unit 1031 is capable of controlling the UE to perform the cell reselection based on first hysteresis information for the first type, included in the SIB. Alternatively, if the UE is not receiving MBMS data, the cell reselection executing unit 1031 is capable of controlling the UE to perform the cell reselection based on second hysteresis information for the second type, included in the SIB.

In an embodiment, if the UE is not receiving MBMS data, the cell reselection executing unit 1031 may detect preset offset information and control the UE to perform the cell reselection, based on hysteresis information, included in the SIB, and the offset information.

In this case, the SIB may include SIB 3.

As described above, the present invention is capable of preventing the cell reselection from frequently occurring when UE receiving MBMS data moves between cells, so that the UE can continuously receive MBMS data without interruption.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. An information transmission method of an evolved node B (eNB) in a wireless communication system comprising:
   generating a system information block including first information including a first hysteresis value to be selected by a first type user equipment (UE) and second information including a second hysteresis value to be selected by a second type UE; and
   broadcasting the generated system information block,
   wherein the first hysteresis value is used for measuring a ranking score of a serving cell of the first type UE to perform cell reselection and the second hysteresis value is used for measuring a ranking score of a serving cell of the second type UE to perform the cell reselection,
   wherein the second hysteresis value is greater than the first hysteresis value, and
   wherein the first type UE does not receive multimedia broadcast multicast service (MBMS) data at a time of receiving the system information block by the UE, and the second type UE receives the MBMS data at the time of receiving the system information block by the UE.

2. The method of claim 1, wherein the system information block comprises:
   a system information block (SIB) 3.

3. A method for user equipment (UE) to perform cell reselection in a wireless communication system comprising:
   receiving, from an evolved node B (eNB), a system information block including first information including a first hysteresis value associated with a first type UE and second information including a second hysteresis value associated with a second type UE;
   determining a type of the UE as the first type, in case that the UE is not receiving multimedia broadcast multicast service (MBMS) data at a time of receiving the system information block, and the type of the UE as the second type, in case that the UE is receiving the MBMS data at the time of receiving the system information block; and
   performing the cell reselection, based on information selected from the first information and the second information included in the system information block, according to the determined type,
   wherein the first hysteresis value is used for measuring a ranking score of a serving cell of the first type UE to perform cell reselection and the second hysteresis value is used for measuring a ranking score of a serving cell of the second type UE to perform the cell reselection, and
   wherein the second hysteresis value is greater than the first hysteresis value.

4. The method of claim 3, wherein performing the cell reselection comprises performing the cell reselection, based on the first hysteresis value included in the system information block, when the type of the UE is determined as the first type.

5. The method of claim 3, wherein performing the cell reselection comprises performing the cell reselection, based on the second hysteresis value included in the system information block, when the type of the UE is determined as the second type.

6. The method of claim 3, wherein the system information block comprises:
   a system information block (SIB) 3.

7. The method of claim 3, further comprising:
   ascertaining preset offset information if the UE is not receiving the MBMS data; and
   performing the cell reselection, based on the offset information and the first hysteresis value included in the system information block.

8. An evolved node B (eNB) for transmitting information in a wireless communication system comprising:
   a transceiver for performing the transmission/reception of signals; and
   a controller for:
      generating a system information block including first information including a first hysteresis value to be selected by a first type user equipment (UE) and second information including a second hysteresis value to be selected by a second type UE; and
      broadcasting the generated system information block,
      wherein the first hysteresis value is used for measuring a ranking score of a serving cell of the first type UE to perform cell reselection and the second hysteresis value is used for measuring a ranking score of a serving cell of the second type UE to perform the cell reselection,
      wherein the second hysteresis value is greater than the first hysteresis value, and
      wherein the first type UE is not receiving multimedia broadcast multicast service (MBMS) data at a time of receiving the system information block by the UE, and the second type UE is receiving the MBMS data at the time of receiving the system information block by the UE.

9. The eNB of claim 8, wherein the system information block comprises:
   a system information block (SIB) 3.

10. A user equipment (UE) for performing cell reselection in a wireless communication system, comprising:
    a transceiver for transmitting/receiving signals to/from an evolved node B (eNB); and
    a controller for:
       receiving, from the eNB, a system information block including first information including a first hysteresis value associated with a first type UE and second information including a second hysteresis value associated with a second type UE;
       determining a type of the UE as the first type, in case that the UE is not receiving multimedia broadcast multicast service (MBMS) data at a time of receiving the system information block, and the type of the UE as the second type, in case that the UE is receiving the MBMS data at the time of receiving the system information block; and
       performing the cell reselection, based on information selected from the first information and the second information included in the system information block, according to the determined type,
    wherein the first hysteresis value is used for measuring a ranking score of a serving cell of the first type UE to perform cell reselection and the second hysteresis value is used for measuring a ranking score of a serving cell of the second type UE to perform the cell reselection, and
    wherein the second hysteresis value is greater than the first hysteresis value.

11. The UE of claim 10, wherein the controller performs the cell reselection, based on the first hysteresis value included in the system information block, when the type of the UE is determined as the first type.

12. The UE of claim 10, wherein the controller performs the cell reselection, based on the second hysteresis value included in the system information block, when the type of the UE is determined as the second type.

13. The UE of claim 10, wherein the system information block comprises:
a system information block (SIB) 3.

14. The UE of claim 10, wherein the controller:
ascertains preset offset information if the UE is not receiving the MBMS data; and
performs the cell reselection, based on the offset information and the first hysteresis value included in the system information block.

* * * * *